United States Patent
Nishimura et al.

(10) Patent No.: US 10,064,345 B2
(45) Date of Patent: Sep. 4, 2018

(54) CULTURE MEDIUM FOR PLANT CULTIVATION

(71) Applicant: KURARAY CO., LTD., Kurashiki-shi (JP)

(72) Inventors: Yasuyo Nishimura, Konan (JP); Takashi Wakui, Kurashiki (JP)

(73) Assignee: KURARAY CO., LTD., Kurashiki-shi (JP)

( * ) Notice: Subject to any disclaimer, the term of this patent is extended or adjusted under 35 U.S.C. 154(b) by 0 days.

(21) Appl. No.: 14/876,178

(22) Filed: Oct. 6, 2015

(65) Prior Publication Data

US 2016/0021833 A1 Jan. 28, 2016

Related U.S. Application Data

(63) Continuation of application No. 13/984,675, filed as application No. PCT/JP2012/052594 on Feb. 6, 2012.

(30) Foreign Application Priority Data

Feb. 10, 2011 (JP) ................................. 2011-026951

(51) Int. Cl.
| | |
|---|---|
| A01G 1/00 | (2006.01) |
| A01G 31/00 | (2018.01) |
| A01G 9/10 | (2006.01) |
| A01G 22/00 | (2018.01) |
| A01G 24/00 | (2018.01) |

(52) U.S. Cl.
CPC ............ *A01G 9/1086* (2013.01); *A01G 22/00* (2018.02); *A01G 24/00* (2018.02); *Y10T 428/2982* (2015.01)

(58) Field of Classification Search
CPC ........ A01G 31/001; A01G 1/001; A01G 9/10; A01G 9/1013; A01G 9/1026; A01G 9/1086; A01G 2031/005; A01G 2031/006; A01G 2031/007; A01G 2031/008
USPC .......................................................... 47/59 S
See application file for complete search history.

(56) References Cited

U.S. PATENT DOCUMENTS

| | | | | |
|---|---|---|---|---|
| 2006/0107589 A1* | 5/2006 | Rubin | .................. | A01G 31/001 47/59 S |
| 2007/0062113 A1* | 3/2007 | Rubin | .................. | A01G 31/001 47/59 S |
| 2011/0232188 A1* | 9/2011 | Kennedy | .............. | A01G 9/1086 47/59 S |
| 2012/0090235 A1* | 4/2012 | Horn | .................... | A01G 31/001 47/59 R |

FOREIGN PATENT DOCUMENTS

| | | |
|---|---|---|
| CN | 2430007 Y | 5/2001 |
| JP | 2-109920 A | 4/1990 |
| JP | 6-98627 A | 4/1994 |
| JP | 8-280281 A | 10/1996 |
| JP | 2003-325044 A | 11/2003 |
| JP | 2004201518 A * | 7/2004 |
| JP | 2007-74970 A | 3/2007 |

OTHER PUBLICATIONS

Machine translation for JP 2004201518 A.*
Board decision for case U.S. Appl. No. 13/984,675 (Year: 2018).*
International Search Report dated May 1, 2012 in PCT/JP2012/052594 filed Feb. 6, 2012.
Combined Chinese Office Action and Search Report dated Jul. 10, 2014 in Patent Application No. 201280017542.9 (with English language translation).
Ma Peilan, et al., "Applications and Study Progress of Ethylene-Vinyl Alcohol Copolymer" Plastics Science and Technology, vol. 3, Jun. 30, 2005, pp. 54-58.

* cited by examiner

*Primary Examiner* — Son T Nguyen
(74) *Attorney, Agent, or Firm* — Oblon, McClelland, Maier & Neustadt, L.L.P.

(57) ABSTRACT

There is provided a medium for plant cultivation comprising an ethylene-vinyl alcohol copolymer chip. An ethylene content of ethylene-vinyl alcohol copolymer included in the ethylene-vinyl alcohol copolymer chip is preferably 20 to 60 mol %. In addition, a water content in the ethylene-vinyl alcohol copolymer chip is preferably 20 to 300 parts by mass relative to 100 parts by mass of the ethylene-vinyl alcohol copolymer. As a result, it is possible to provide a medium for plant cultivation, which is capable of being used instead of the soil or rock wools, and with which it is possible to sufficiently grow crop plants, to have excellent recyclability, to facilitate a process for disposal the medium, and to have a small environmental burden.

20 Claims, No Drawings

CULTURE MEDIUM FOR PLANT CULTIVATION

CROSS-REFERENCE TO RELATED APPLICATION

The present application is a division of U.S. application Ser. No. 13/984,675, filed Aug. 9, 2013, which is a National Stage (371) of PCT/JP12/052594, filed Feb. 6, 2012, and claims priority to JP 2011-026951, filed Feb. 10, 2011.

TECHNICAL FIELD

The present invention relates to a medium for plant cultivation, capable of being used instead of the conventional soil or rock wool when cultivating various crop plants such as a flower, a vegetable, fruits, and grains. More particularly, the present invention relates to a medium for plant cultivation with which it is possible to sufficiently grow crop plants, to have excellent recyclability, to facilitate a process for disposal the medium, and to have a small environmental burden.

BACKGROUND ART

Since nutriculture does not employ the soil for cultivating crop plants, there is no replant problem, and it is easy to control cultivation environment, and nutrient and water managements. Further, the nutriculture allows for automation and energy saving, and has been noticed as a cultivation method having high harvest cleanliness and high fertilizer efficiency.

Since a solid medium for nutriculture is immersed in water, water resistance to a certain degree is needed and also water permeability, water retentivity, air-permeability, strength, and the like are required. Conventionally, as a solid medium for nutriculture, rock wools prepared by converging natural stones (mainly basalt) in a fiber shape are known.

For nutriculture, since roots are scattered around in the interior of a solid medium, there may be a need to exchange with a new solid medium. However, when rock wool is used as a solid medium, the rock wool is difficult to recycle. Furthermore, since the rock wool is inorganic material, there is no effective method of disposing of the used rock wool. Presently, as a disposal method, various methods are adopted such as a method of disposal the rock wool as industrial waste and a method of spading the rock wool in small quantities in a field. However, there is a limit in these methods. This calls for a medium capable of maintaining physicality such as water resistance, water permeability, water retentivity, air-permeability, and strength, which are needed as a medium for plant cultivation, sufficiently growing crop plants with a physicochemically stable property, and having a small environment burden.

In order to achieve the above objects, a method of using, as a medium for plant cultivation, a carbide obtained by carbonizing organic waste produced when preparing food, such as brewer's grains is known (see Patent Reference 1). Patent Reference 1 mentions that such a medium has excellent air-permeability, water retentivity, and the like, and has a small environment burden when being produced or disposed. However, it is difficult to put the medium to practical use because it is needed to burn the medium at high temperature (for example, 750 to 850° C.) when obtaining a carbide, the operation is complicated, and energy (costs) for carbonization is increased.

Meanwhile, a medium for plant cultivation using polyvinyl alcohol is also known. For example, Patent Reference 2 mentions that completely saponified type polyvinyl alcohol resin having a degree of saponification of 98 mol % or more is used as a binding agent for charcoal powder. Patent Reference 2 describes a medium in which the completely saponified type polyvinyl alcohol resin having a degree of saponification of 98 mol % or more is hydrophilic but is difficult to be dissolved in water, and when the resin is used as a binding agent for the charcoal powder, it is possible to improve the wettability relative to water on the particle surfaces of the charcoal powder and the resin is not easily destructed when it is immersed in water. However, even when the completely saponified type polyvinyl alcohol resin having a degree of saponification of 98 mol or more is used, the resin is still water soluble polymer. When the medium mentioned in Patent Reference 2 is used for a long period of time, since the polyvinyl alcohol resin is slowly flowed out, it is difficult to grow crop plants for a long period of time.

Further, Patent Reference 3 mentions a nutriculture method using a porous article in a particle shape or chip shape as a medium, in which the porous article is preferably prepared by using, in view of water absorptive and hygroscopic retentions, polyvinyl alcohol as a material. However, as described above, since the polyvinyl alcohol is water soluble polymer, a long-term stability is not sufficiently obtained under a wet condition and in a case of growing crop plants for a long period of time, it is difficult to maintain a shape of the medium. Accordingly, it is not easy to realize the practical use of these products.

In addition, since the polyvinyl alcohol has high affinity with water and high water retentivity, in a case of cultivating crop plants such as a tomato, there is a problem in that water stress is not applied to the crop plants, and thus a sugar content is not increased. In addition, in a case of using polyvinyl alcohol chip as a medium, the chips are fused due to long-term use, and thus air gaps between the chips are reduced, resulting in inhibiting the growth of plant roots. In addition, the chips are fused in a state of gathering the roots of plants therein, and thus it is difficult to remove the roots. Accordingly, there is a problem in that recyclability of the medium is not insufficient.

PRIOR ART REFERENCES

Patent References

Patent Reference 1:JP2003-325044A
Patent Reference 2:JP8-280281A
Patent Reference 3:JP2-109920A

SUMMARY OF THE INVENTION

Problems to be Solved by the Invention

An object of the present invention is to provide a medium for plant cultivation, which is capable of being used instead of the soil or rock wools, and with which it is possible to sufficiently grow crop plants, to have excellent recyclability, to facilitate a process for disposal the medium, and to have a small environmental burden.

Means for Solving the Problems

In order to resolve the above problem, the present inventors conducted thorough investigations, and as a result, the inventors found that it was possible to resolve the above problem by using an ethylene-vinyl alcohol copolymer chip. Thus, on the basis of the findings, the inventors further studied the subject to finally complete the present invention.

In other words, the present invention relates to:

[1] a medium for plant cultivation, the medium comprising an ethylene-vinyl alcohol copolymer chip;

[2] the medium for plant cultivation according to the above [1], wherein an ethylene content of ethylene-vinyl alcohol copolymer included in the ethylene-vinyl alcohol copolymer chip is 20 to 60 mol %;

[3] the medium for plant cultivation according to the above [1] or [2], wherein a melt flow rate (measured by a method described in ASTM D1238 under a condition that a temperature is 190° C. and load is 2.16 kg) of the ethylene-vinyl alcohol copolymer included in the ethylene-vinyl alcohol copolymer chip is 0.1 to 100 g/10 minutes;

[4] the medium for plant cultivation according to any one of the above [1] to [3], wherein the ethylene-vinyl alcohol copolymer chip contains ethylene-vinyl alcohol copolymer and water, and a content of the water is 20 to 300 parts by mass relative to 100 parts by mass of the ethylene-vinyl alcohol copolymer;

[5] the medium for plant cultivation according to any one of the above [1] to [4], wherein a water absorption ratio defined by the following formula (1) is 20% by mass or more, where W1 denotes the mass of the ethylene-vinyl alcohol copolymer chip that is obtained by being immersed in water at 23° C. for 24 hours; and W0 denotes the mass of a chip that is obtained by drying the immersed chip:

Water absorption ratio (% by mass)=
100×($W1$-$W0$)/$W0$  (1);

[6] the medium for plant cultivation according to any one of the above [1] to [5], wherein a maximum length of the ethylene-vinyl alcohol copolymer chip is within a range of 1 to 50 mm;

[7] the medium for plant cultivation according to any one of the above [1] to [6], wherein a shape of the ethylene-vinyl alcohol copolymer chip is approximately a globular shape, approximately a disc shape, approximately a cylinder shape, or a flake shape; and

[8] the medium for plant cultivation according to any one of the above [1] to [7], wherein a content of the ethylene-vinyl alcohol copolymer chip is 50% by mass or more.

Effects of the Invention

According to the present invention, provided is a medium for plant cultivation, with which it is possible to sufficiently grow crop plants, which is capable of being repeatedly used because of excellent recyclability, with which it is possible to facilitate a process for disposal the medium because the medium can be easily disposed by incineration after use, and to have a small environment burden.

Mode for Carrying out the Invention

A medium for plant cultivation according to the present invention includes an ethylene-vinyl alcohol copolymer chip.

The ethylene-vinyl alcohol copolymer included in the ethylene-vinyl alcohol copolymer chip is a copolymer consisting mainly of an ethylene unit ($-CH_2CH_2-$) and a vinyl alcohol unit ($-CH_2-CH(OH)-$). A ratio of a total molar amount of the ethylene unit and the vinyl alcohol unit, relative to the molar amount of the total structure units constituting the ethylene-vinyl alcohol copolymer, preferably is 80 mol % or more, more preferably 90 mol % or more, still more preferably 95 mol % or more, and particularly preferably 99 mol % or more.

In addition, an ethylene content of the ethylene-vinyl alcohol copolymer (a ratio of the molar amount of the ethylene unit relative to the molar amount of the total structure units constituting the ethylene-vinyl alcohol copolymer) preferably is within a range of 20 to 60 mol % and more preferably within a range of 22 to 58 mol %. When the ethylene content falls below the above-described range, the medium for plant cultivation thus obtained has insufficient durability and the ethylene-vinyl alcohol copolymer may be eluted when being continuously used for a long period of time. Furthermore, when the ethylene content exceeds the above-described range, the medium for plant cultivation thus obtained may have decreased hydrophilicity and strength.

A method of preparing the ethylene-vinyl alcohol copolymer is not particularly limited, and may include well-known preparing methods. For example, in a general method, an ethylene-vinyl ester copolymer obtained by copolymerizing ethylene and vinyl ester monomer is saponified under the presence of a saponification catalyst, in an organic solvent including alcohol.

Examples of the vinyl ester monomer may include vinyl formate, vinyl acetate, vinyl propionate, vinyl butyrate, vinyl isobutyrate, vinyl pivalate, vinyl versatate, vinyl caproate, vinyl caprylate, vinyl laurate, vinyl palmitate, vinyl stearate, vinyl oleate, and vinyl benzoate. Particularly, vinyl acetate is preferable.

A method of copolymerizing ethylene and vinyl ester monomer may include well-known methods such as solution polymerization, bulk polymerization, suspension polymerization, and emulsion polymerization. As a polymerization initiator, an azo-based initiator, peroxide-based initiator, redox-based initiator, and the like may be properly selected according to a polymerization method. At this time, the copolymerization may be performed under presence of thiol compounds such as thioacetic acid and mercaptopropionic acid, or other chain-transfer agents.

As a saponification reaction, alcoholysis, hydrolysis, and the like, which uses a well-known alkali catalyst or acidic catalyst as a saponification catalyst in an organic solvent, may be adopted. In particular, a saponification reaction using a caustic soda catalyst with methanol as a solvent is simple and easy, and thus, most preferable.

A melt flow rate (measured according to a method described in ASTM D1238 under a condition that a temperature is 190° C. and load is 2.16 kg) of the ethylene-vinyl alcohol copolymer is preferably within a range of 0.1 to 100 g/10 minutes, more preferably within a range of 0.5 to 50 g/10 minutes, and still more preferably within a range of 1 to 20 g/10 minutes because it is possible to expect that a chip is preferably molded. When the melt flow rate falls below the above-described ranges, torque may be too high in a case where a chip is molded by melt-mixing. Further, when the melt flow rate exceeds the above-described ranges, it is difficult to continuously produce a chip, also the strength is insufficient in a case where a chip is produced, and thereby performance as a medium may be deteriorated.

The ethylene-vinyl alcohol copolymer chip included in the medium for plant cultivation according to the present invention may preferably contain water in addition to the ethylene-vinyl alcohol copolymer. A content of water in the ethylene-vinyl alcohol copolymer chip is preferably 20 parts by mass or more and more preferably 30 parts by mass or more relative to 100 parts by mass of the ethylene-vinyl alcohol copolymer. In addition, the content of water is preferably 300 parts by mass or less relative to 100 parts by mass of the ethylene-vinyl alcohol copolymer.

The ethylene-vinyl alcohol copolymer chip included in the medium for plant cultivation according to the present invention may be constituted only with the above-described ethylene-vinyl alcohol copolymer or constituted only with the ethylene-vinyl alcohol copolymer and water. If necessary, the ethylene-vinyl alcohol copolymer chip may further include other components, except for an ethylene-vinyl alcohol copolymer and water, such as alkali metal salt, a boron compound, carboxylic acid or salt thereof, a phosphorus compound, alkaline-earth metal salt, and carbon dioxide. A content ratio of the total amount of the ethylene-vinyl alcohol copolymer and water, relative to the above-described ethylene-vinyl alcohol copolymer chip, is preferably 80% by mass or more, more preferably 90% by mass or more, and still more preferably 95% by mass or more.

A shape of the ethylene-vinyl alcohol copolymer chip included in the medium for plant cultivation according to the present invention is not particularly limited, and for example, may be approximately a globular shape or approximately a disc shape obtained by hot-cutting a molten material including the ethylene-vinyl alcohol copolymer, approximately a cylinder shape obtained by cutting a strand including the ethylene-vinyl alcohol copolymer, a flake shape or an irregular shape. In addition, a size of the ethylene-vinyl alcohol copolymer chip is not particularly limited; however, for example, a maximum length is preferably within a range of 1 to 50 mm and more preferably within a range of 1 to 20 mm. In addition, it is possible to measure the maximum length by using a vernier caliper.

In the ethylene-vinyl alcohol copolymer chip included in the medium for plant cultivation according to the present invention, water absorption ratio as defined as the following formula (1) is preferably 20% by mass or more and more preferably 30% by mass or more, where W1 denotes the mass of the chip that is obtained by being immersed in water of 23° C. for 24 hours; and W0 denotes the mass of a chip dried that is obtained by drying the immersed chip (at 105° C. for 24 hours). When the water absorption ratio is within such a range, it is possible to obtain a medium for plant cultivation having excellent water retentivity. Meanwhile, an upper limit of the water absorption ratio is not particularly limited; however, the upper limit is preferably 300% by mass or less from the viewpoint of strength of the chip.

$$\text{Water absorption ratio (\% by mass)} = 100 \times (W1 - W0)/W0 \quad (1)$$

The medium for plant cultivation according to the present invention may be constituted only with the ethylene-vinyl alcohol copolymer chip, and may further include, along with the ethylene-vinyl alcohol copolymer chip, components such as rock wools, sand, soil, ceramic balls, coconut husk, bark, peat moss, and sphagnum moss. A content ratio of the ethylene-vinyl alcohol copolymer chip, relative to the medium for plant cultivation according to the present invention, is preferably 50% by mass or more, more preferably 80% by mass or more, and still more preferably 95% by mass or more.

An embodiment of the medium for plant cultivation according to the present invention is not particularly limited; however, the medium is preferably used as a medium for nutriculture using a culture solution. In a case of using the medium for plant cultivation according to the present invention as a medium for nutriculture, examples of a use method may include a method, in which the medium for plant cultivation according to the present invention is placed in a container such as a pot, a culture solution is added to the container, and seeds are sown or a seedling is transplanted. The method of cultivating various plants by preparing a bed for cultivation including the medium for plant cultivation according to the present invention and then by transplanting grown seedling thereon may be exemplified.

A kind of plants cultivated by using the medium for plant cultivation according to the present invention is not particularly limited, and for example, may be a flower, a vegetable, fruits, and grains. Particularly, the medium is preferably used for cultivating a vegetable such as tomato, eggplant, and green pepper.

EXAMPLES

Hereinafter, the present invention will be described in more detail with reference to Examples. However, the present invention is not limited to these Examples. In addition, each method of evaluating a growth degree of seedling or crops and each method of determining recyclability and ease of disposal, which are adopted in the following Examples and Comparative Examples, are as follows.

[Method of Evaluating Growth Degree of Seedling]

On May 24, tomato (Species "House Momotaro") seeds were sprouted in an incubator set to be 30° C., and on May 27, sprouting seeds were sown in a seedling bad filled with bark compost for raising a seedling. On June 10, when the true leaf almost started unfolding, the seeding was transplanted into an apparatus for cultivation, which was prepared for the following Examples or the Comparative Examples, and then, the seedling was nutricultured. Then, on June 24, the growth degree of the seedling was evaluated by measuring above-ground fresh weight (weight of the stem and leaf parts) of the nurturing seedling, above-ground dry matter content thereof, leaf weight thereof, stem weight thereof, and root weight thereof.

It should be noted that, as a culture solution during a cultivation period, a solution (N:98.7 ppm, P:19.4 ppm, K:125.7 ppm, Ca:63.0 ppm, Mg:13.4 ppm, Mn:0.709 ppm, B:0.487 ppm, Fe:2.025 ppm, Cu:0.018, Zn:0.048ppm, Mo:0.019 ppm) prepared by mixing and dissolving "Otsuka House No. 1", "Otsuka House No. 2", and "Otsuka House No. 5", as the compost for nutriculture, manufactured by Otsuka Chemical Co., Ltd. was used, and then watering was appropriately performed using the culture solution depending on weather or the growth situation of the seedling.

[Method of Evaluating Crops]

By using the seedling obtained from the above evaluation, the tomato was cultivated, and then the crops were evaluated. Specifically, a planter paved with the vinyl alcohol copolymer chips and a planter paved with rock wools were prepared. Then, the seedling obtained from the above-described evaluation was transplanted into the planter paved with the same medium as the medium used for growing the seedling so as to cultivate tomato. The watering was performed by using the above-described culture solution through a drip-watering tube one to four times a day according to weather in the early stage of cultivating and one time a hour (for 3 minutes/time) from 7:00 to 17:00 from a fruit enlargement period of a first bunch to the time of finishing the test.

When the whole fruits ripened to a red, the fruit was harvested. Then, an average bunch weight per stock was measured. In addition, after measuring the average bunch weight, a sugar content of the tomato also was evaluated. As a method for evaluation, the fruit was squeezed with gauze, the squeezed fruit was filtered, and then a sugar content of filtrate thereof was evaluated by using "PR-1" manufactured by Atago Co., Ltd.

[Method of Determining Recyclability]

At the time of evaluating a growth degree of a seedling, the medium was removed from roots by hand, and then whether or not the medium can be again used as a medium for plant cultivation was determined. When it was possible to easily remove the medium from the roots, it was determined as "A"; however when it was not possible to easily remove the medium from the roots, it was determined as "B".

[Method of Determining Ease of Disposal]

When it was possible to incinerate the medium, it was determined as "A"; however, it was not possible to incinerate the medium, it was determined as "B".

Example 1

An ethylene-vinyl alcohol copolymer chip (chip of saponification product of copolymer of ethylene and vinyl acetate, ethylene content of ethylene-vinyl alcohol copolymer: 32 mol %, saponification degree of ethylene-vinyl alcohol copolymer: 99 mol % or more, melt flow rate of ethylene-vinyl alcohol copolymer (measured by a method described in ASTM D1238 under a condition that a temperature is 190° C. and load is 2.16 kg):1.3 g/10 minutes, water absorption ratio: containing 80 parts by mass (80% by mass) of water relative to 100 parts by mass of ethylene-vinyl alcohol copolymer, chip shape: approximately cylinder shape (diameter of 2 mm×length of 10 mm)) was used as a medium for plant cultivation and filled in a black plastic pot having a diameter of 9 cm, and a culture solution was added so as to prepare an apparatus for cultivation. A growth degree of a seedling was evaluated and recyclability was determined according to the method described above by using the apparatus for cultivation thus obtained. In addition, the seedling thus obtained was cultivated according to the above-described method, and then the average bunch weight of the crops and the sugar degree thereof were measured. In addition, according to the method described above, the ease of disposal the medium for plant cultivation was determined. The results are listed in Table 1.

Example 2

An apparatus for cultivation was prepared in much the same way as Example 1 except that an ethylene-vinyl alcohol copolymer chip (chip of saponification product of copolymer of ethylene and vinyl acetate, ethylene content of ethylene-vinyl alcohol copolymer: 27 mol %, saponification degree of ethylene-vinyl alcohol copolymer: 99 mol % or more, melt flow rate of ethylene-vinyl alcohol copolymer (measured by a method described in ASTM D1238 under a condition that a temperature is 190° C. and load is 2.16 kg):3.9 g/10 minutes, water absorption ratio: containing 90 parts by mass (90% by mass) of water relative to 100 parts by mass of ethylene-vinyl alcohol copolymer, chip shape: approximately cylinder shape (diameter of 2 mm x length of 10 mm)) was used instead of the ethylene-vinyl alcohol copolymer chip used in Example 1. A growth degree of a seedling, an average bunch weight of the crops, and a sugar degree of the crops were measured by using the method described above, and also recyclability was determined. In addition, according to the method described above, the ease of disposal the medium for plant cultivation was determined. The results are listed in Table 1.

Example 3

An apparatus for cultivation was prepared in much the same way as Example 1 except that an ethylene-vinyl alcohol copolymer chip (chip of saponification product of copolymer of ethylene and vinyl acetate, ethylene content of ethylene-vinyl alcohol copolymer: 44 mol %, saponification degree of ethylene-vinyl alcohol copolymer: 99 mol % or more, melt flow rate of ethylene-vinyl alcohol copolymer (measured by a method described in ASTM D1238 under a condition that a temperature is 190° C. and load is 2.16 kg):5.5 g/10 minutes, water absorption ratio:containing 70 parts by mass (70% by mass) of water relative to 100 parts by mass of ethylene-vinyl alcohol copolymer, chip shape: approximately cylinder shape (diameter of 2 mm×length of 10 mm)) was used instead of the ethylene-vinyl alcohol copolymer chip used in Example 1. A growth degree of a seedling, an average bunch weight of the crops, a sugar degree of the crops were measured by using the method described above, and also recyclability was determined. In addition, according to the method described above, the ease of disposal the medium for plant cultivation was determined. The results are listed in Table 1.

Comparative Example 1

An apparatus for cultivation was prepared in much the same way as Example 1 except that a polyethylene terephthalate chip (manufactured by Aldrich, chip shape: approximately cylinder shape (diameter of 2 mm×length of 10 mm)) was used instead of the ethylene-vinyl alcohol copolymer chip in Example 1. According to the method described above, a growth degree of a seedling and recyclability were determined. In addition, according to the above-described method, the ease of disposal the medium for plant cultivation was determined. The results are listed in Table 1.

Comparative Example 2

An apparatus for cultivation was prepared in much the same way as Example 1 except that a rock wool medium that is often used at present (manufactured by Nichias Corporation, Size: 7 cm×6.5 cm×7.5 cm, Side having a vinyl wrapping) was used instead of the ethylene-vinyl alcohol copolymer chip in Example 1. A growth degree of a seedling, an average bunch weight of the crops, a sugar degree of the crops were measured by using the method described above, and also recyclability was determined. In addition, according to the method described above, the ease of disposal the medium for plant cultivation was determined. The results are listed in Table 1.

TABLE 1

|  |  | Example 1 | Example 2 | Example 3 | Comparative Example 1 | Comparative Example 2 |
|---|---|---|---|---|---|---|
| growth degree of seedling | above-ground fresh weight [g] | 7.8 | 8.3 | 7.8 | Not grown | 9.4 |
|  | dry matter content [%] | 8.6 | 8.2 | 8.6 | Not grown | 8.4 |
|  | leaf weight [g] | 4.3 | 4.6 | 4.1 | Not grown | 5.1 |
|  | stem weight [g] | 3.5 | 3.6 | 3.3 | Not grown | 4.3 |
|  | root weight [g] | 0.1 | 0.1 | 0.1 | Not grown | Not possible to measure |
|  | total assessment | A | A | A | B | A |
| evaluation of crops | average bunch weight [g] | 182.6 | 186.1 | 184.8 | — | 198.2 |
|  | sugar content Bx [%] | 6.1 | 6.2 | 6.1 | — | 4.8 |
|  | recyclability | A | A | A | A | B |
|  | ease of disposal | A | A | A | A | B |

According to a comparison between the Examples 1 to 3 and the Comparative Example 1, the growth degree of a seedling was good in the medium for plant cultivation including the ethylene-vinyl alcohol copolymer chip according to the present invention; however, the seedling was not grown in the Comparative Example 1 using the polyethylene terephthalate chip as the medium for plant cultivation. In addition, according to a comparison between the Examples 1 to 3 and the Comparative Example 2, the medium for plant cultivation according to the present invention exhibited the same growth degree of the seedling as the rock wools medium, and also exhibited a higher sugar degree of the tomato harvested than that using the rock wools medium. The reason for this may be that since the ethylene-vinyl alcohol copolymer chip has suitable water retentivity, water stress is applied to crop plants in the medium for plant cultivation according to the present invention, resulting in increasing the sugar degree. In addition, in the medium for plant cultivation according to the present invention, the medium could be easily removed from roots and also had excellent recyclability. Meanwhile, in a case of using a rock wools medium, it was difficult to remove roots from the rock wools because the roots of seedling were tangled around the rock wools.

The invention claimed is:

1. A method for plant cultivation, comprising:
   placing a medium comprising an ethylene-vinyl alcohol copolymer chip in a container wherein the ethylene-vinyl alcohol copolymer chip comprises ethylene-vinyl alcohol copolymer and water, and a water content is 300 parts by mass or less relative to 100 parts by mass of the ethylene-vinyl alcohol copolymer;
   adding a culture solution to the container;
   sowing a seed or transplanting a seedling;
   cultivating a plant grown from said seed or seedling;
   recovering the medium in which the roots of said plant is contained by removing the medium from roots; and
   using the medium again to cultivate plants.

2. The method according to claim 1, wherein said using comprises preparing a bed comprising the medium; and then transplanting a grown seedling in the bed wherein said grown seedling is other than that for said sowing a seed or transplanting a seedling.

3. The method according to claim 1, wherein an ethylene content of ethylene-vinyl alcohol copolymer in the ethylene-vinyl alcohol copolymer chip is from 20 to 60 mol %.

4. The method according to claim 1, wherein a maximum length of the ethylene-vinyl alcohol copolymer chip is from 1 to 50 mm.

5. The method according to claim 1, wherein a shape of the ethylene-vinyl alcohol copolymer chip is approximately a globular shape, approximately a disc shape, approximately a cylinder shape, or a flake shape.

6. The method according to claim 1, wherein a content of the ethylene-vinyl alcohol copolymer chip is 50% by mass or more.

7. The method according to claim 1, wherein the medium comprises a polymer chip, and the polymer therein consists essentially of an ethylene-vinyl alcohol copolymer.

8. A method for plant cultivation, comprising:
   placing a medium comprising an ethylene-vinyl alcohol copolymer chip in a container wherein the ethylene-vinyl alcohol copolymer chip comprises ethylene-vinyl alcohol copolymer and water, and a water content is 300 parts by mass or less relative to 100 parts by mass of the ethylene-vinyl alcohol copolymer;
   adding a culture solution to the container;
   sowing a seed or transplanting a seedling;
   cultivating a plant grown from said seed or seeding;
   removing the medium from the roots which are scattered around in the medium; and
   using the medium again to cultivate plants.

9. The method according to claim 8, wherein said using comprises preparing a bed comprising the medium; and then transplanting a grown seedling in the bed wherein said grown seedling is other than that for said sowing a seed or transplanting a seedling.

10. The method according to claim 8, wherein an ethylene content of ethylene-vinyl alcohol copolymer in the ethylene-vinyl alcohol copolymer chip is from 20 to 60 mol %.

11. The method according to claim 8, wherein a maximum length of the ethylene-vinyl alcohol copolymer chip is from 1 to 50 mm.

12. The method according to claim 8, wherein a shape of the ethylene-vinyl alcohol copolymer chip is approximately a globular shape, approximately a disc shape, approximately a cylinder shape, or a flake shape.

13. The method according to claim 8, wherein a content of the ethylene-vinyl alcohol copolymer chip is 50% by mass or more.

14. The method according to claim 8, wherein the medium comprises a polymer chip, and the polymer therein consists essentially of an ethylene-vinyl alcohol copolymer.

15. A method for plant cultivation, comprising:
placing a medium comprising a polymer chip in a container, the polymer therein consists essentially of an ethylene-vinyl alcohol copolymer and water, and a water content is 300 parts by mass or less relative to 100 parts by mass of the ethylene-vinyl alcohol copolymer;
adding a culture solution to the container;
sowing a seed or transplanting a seedling;
cultivating a plant grown from said seed or seeding;
removing the medium from roots; and
using the medium again to cultivate plants.

16. The method according to claim 15, wherein said using comprises preparing a bed comprising the medium; and then transplanting a grown seedling in the bed wherein said grown seedling is other than that for said sowing a seed or transplanting a seedling.

17. The method according to claim 15, wherein an ethylene content of ethylene-vinyl alcohol copolymer in the ethylene-vinyl alcohol copolymer chip is from 20 to 60 mol %.

18. The method according to claim 15, wherein a maximum length of the ethylene-vinyl alcohol copolymer chip is from 1 to 50 mm.

19. The method according to claim 15, wherein a shape of the ethylene-vinyl alcohol copolymer chip is approximately a globular shape, approximately a disc shape, approximately a cylinder shape, or a flake shape.

20. The method according to claim 15, wherein a content of the ethylene-vinyl alcohol copolymer chip is 50% by mass or more.

* * * * *